(12) United States Patent
Wang et al.

(10) Patent No.: US 11,133,777 B2
(45) Date of Patent: Sep. 28, 2021

(54) SOLAR ARRAY COMMUNICATIONS

(71) Applicants: Fan Wang, San Marino, CA (US); Jing Wang, Palo Alto, CA (US)

(72) Inventors: Fan Wang, San Marino, CA (US); Jing Wang, Palo Alto, CA (US)

( * ) Notice: Subject to any disclaimer, the term of this patent is extended or adjusted under 35 U.S.C. 154(b) by 0 days.

(21) Appl. No.: 17/024,563

(22) Filed: Sep. 17, 2020

(65) Prior Publication Data

US 2021/0006203 A1 Jan. 7, 2021

Related U.S. Application Data

(63) Continuation-in-part of application No. 15/494,284, filed on Apr. 21, 2017, now abandoned.

(51) Int. Cl.
| | |
|---|---|
| *H02S 40/00* | (2014.01) |
| *H02S 40/36* | (2014.01) |
| *H02S 40/32* | (2014.01) |
| *H02S 50/00* | (2014.01) |

(52) U.S. Cl.
CPC ............. *H02S 40/36* (2014.12); *H02S 40/00* (2013.01); *H02S 40/32* (2014.12); *H02S 50/00* (2013.01)

(58) Field of Classification Search
CPC ................................ H02S 40/00; H02S 40/36
See application file for complete search history.

(56) References Cited

U.S. PATENT DOCUMENTS

| | | |
|---|---|---|
| 5,327,892 A | 7/1994 | Nakamura |
| 8,274,172 B2 | 9/2012 | Hadar |
| 8,653,689 B2 | 2/2014 | Rozenboim |
| 9,112,379 B2 * | 8/2015 | Sella ................. H01L 31/02021 |
| 9,524,832 B2 | 12/2016 | Orr |
| 9,991,717 B1 | 6/2018 | Rowe |
| 10,720,878 B2 | 7/2020 | Ehlmann |
| 2004/0041665 A1 | 3/2004 | Hode |
| 2004/0135676 A1 | 7/2004 | Berkman |
| 2011/0261027 A1 | 10/2011 | Lee |
| 2013/0009483 A1 | 1/2013 | Kawate |
| 2013/0194706 A1 | 8/2013 | Har-Shai |
| 2015/0028692 A1 | 1/2015 | Makhota |
| 2017/0163311 A1 * | 6/2017 | Kahn ..................... H04B 3/546 |
| 2018/0233902 A1 | 8/2018 | Sano |

FOREIGN PATENT DOCUMENTS

JP 2013055819 A 3/2013

* cited by examiner

*Primary Examiner* — Adi Amrany
(74) *Attorney, Agent, or Firm* — Paul D. Chancellor; Ocean Law

(57) ABSTRACT

A solar panel array includes panel bridges associated with solar panels and a signal bridge associated with the converter for communicating with the panel bridges.

19 Claims, 18 Drawing Sheets

|  | Converter Toroid | Panel Toroid |
|---|---|---|
| 1) Safety, converter toroid to panel toroid | Injects signal at converter | Receives signal at panel, changes state of switch |
| 2) Metrics, panel toroid to converter toroid | Receives signal at converter, determines one or more of voltage, current, and temperature from signal | Injects signal at panel |

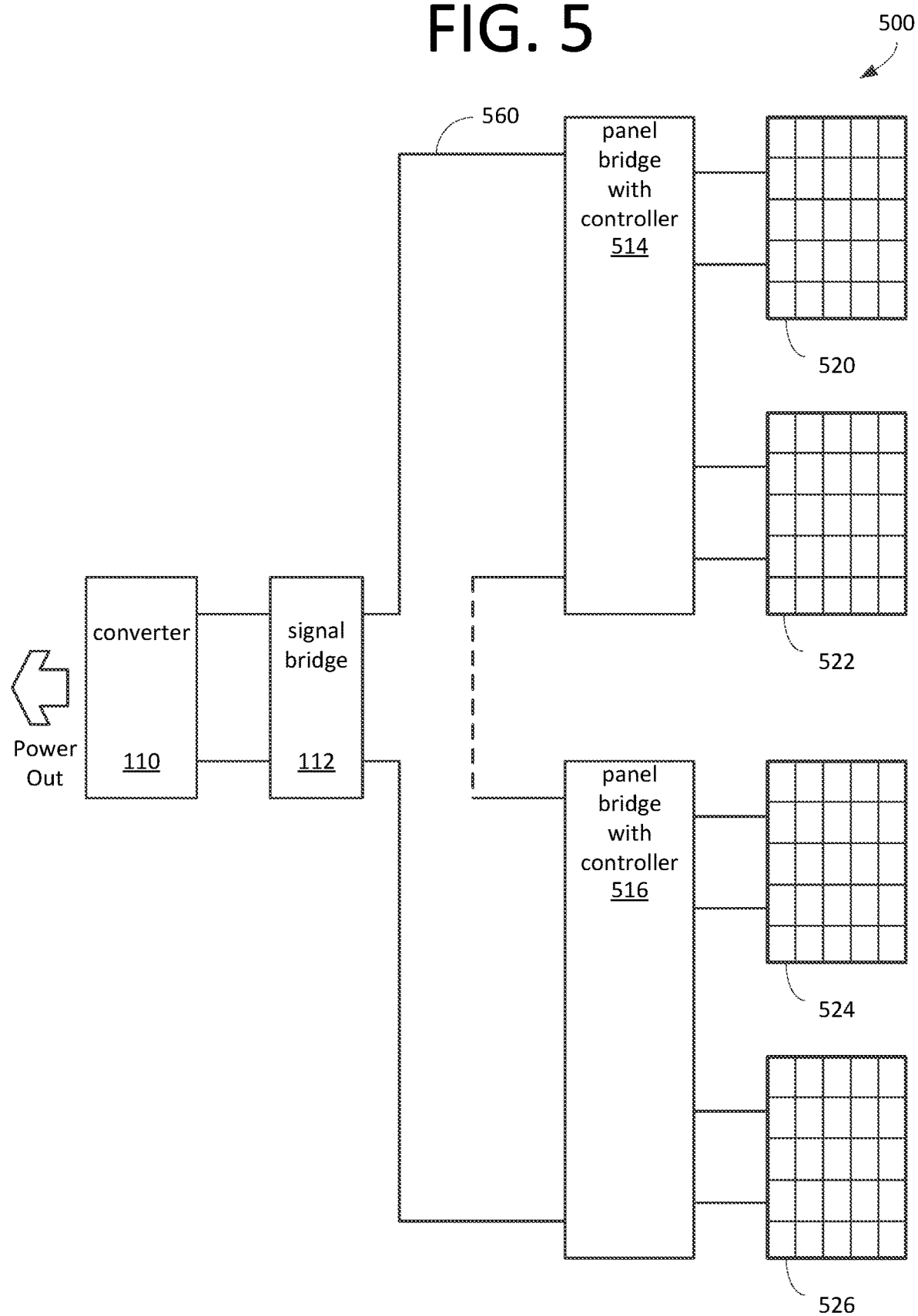

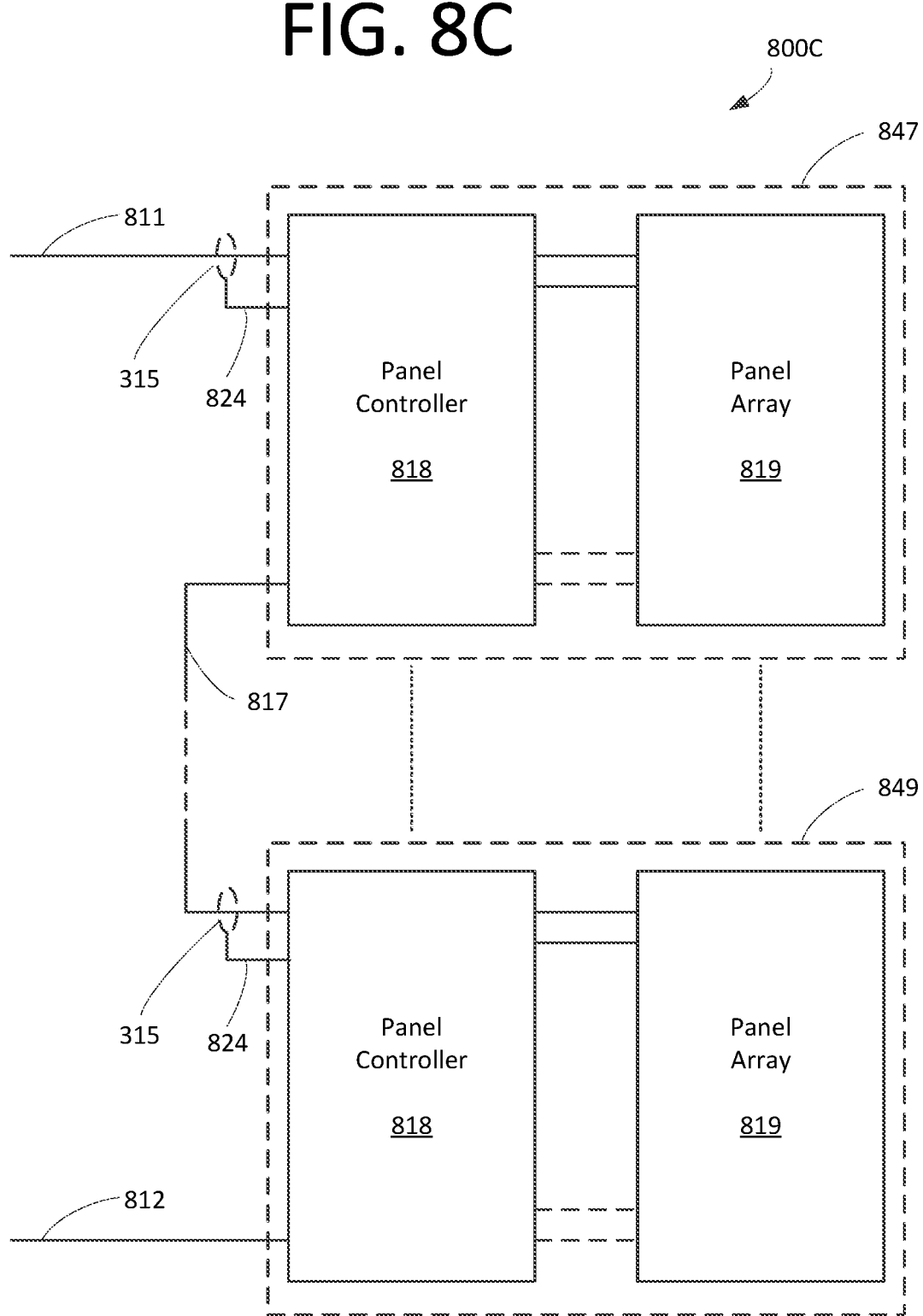

SOLAR ARRAY COMMUNICATIONS

PRIORITY CLAIM

This application is a continuation in part of U.S. patent application Ser. No. 15/494,284 SOLAR ARRAY COMMUNICATIONS filed Apr. 21, 2017.

BACKGROUND OF THE INVENTION

Field of the Invention

The present invention relates to an article of manufacture for conducting electrical signals. In particular, a solar array communicates signals such as signals destined for or originating from a solar panel.

Discussion of the Related Art

Solar panel arrays provide for generation and collection of electric power. Communication from the panels of information including current and voltage has been an afterthought. Communication to the panels is a facility that has received little if any attention.

SUMMARY OF THE INVENTION

The present invention provides a means for communicating signals through a solar array. In an embodiment a solar panel array communications system comprising: a plurality of panels connected in a series circuit, the panels for supplying a converter; signal bridges including a resistor in parallel with a capacitor; panel bridges including a signal bridge in parallel with a diode; a signal bridge across the converter inputs and a first toroidal transformer for injecting a current into the signal bridge capacitor; and, for each of the panels a panel bridge across the panel outputs, a second toroidal transformer for sensing current passing through the panel bridge, and a switch activated by the second toroidal transformer; wherein the switch is for removing the panel from the circuit and a change in current injected by the first toroidal transformer is sensed by the second toroidal transformer to change the state of the switch.

In an embodiment the solar panel array communications system further comprising: a temperature transducer for measuring a temperature associated with one of the solar panels; the second toroidal transformer for injecting a current in the panel bridge lead that is related to the measured temperature; and, the first toroidal transformer for sensing the injected current. In an embodiment the solar panel array communications system further comprises: a current transducer for measuring a current associated with one of the solar panels; the second toroidal transformer for injecting a current in the panel bridge lead that is related to the measured current; and, the first toroidal transformer for sensing the injected current. In an embodiment the solar panel communications system further comprises: a voltage transducer for measuring a voltage associated with one of the solar panels; the second toroidal transformer for injecting a current in the panel bridge lead that is related to the measured voltage; and, the first toroidal transformer for sensing the injected current.

In an embodiment, a solar panel array communication system comprising: a plurality of panels connected in a series circuit, the panels for supplying a converter; signal bridges including a resistor in parallel with a capacitor; panel bridges including a diode in parallel with a signal bridge; for a first pair of panels, panel bridges across panel outputs and a first toroidal transformer for sensing current in a panel bridge lead; for each of the first pair of panels, switches for removing the panels from the circuit; for a second pair of panels, panel bridges across panel outputs and a second toroidal transformer for sensing current in a panel bridge lead; for each of the second pair of panels, switches for removing the panels from the circuit; and, a signal bridge across the converter inputs and a third toroidal transformer for injecting current into a signal bridge lead; wherein the state of the switches is changed when the current injected at the third toroidal transformer is changed.

In an embodiment, the solar panel array communication system further comprises: a temperature transducer for measuring a temperature associated with one of the solar panels; the second toroidal transformer for injecting a current in the panel bridge lead that is related to the measured temperature; and, the third toroidal transformer for sensing the injected current. In an embodiment, the solar panel communication system further comprises: a current transducer for measuring a current associated with one of the solar panels; the second toroidal transformer for injecting a current in the panel bridge lead that is related to the measured current; and, the third toroidal transformer for sensing the injected current. In an embodiment the solar panel communication system further comprises: a voltage transducer for measuring a voltage associated with one of the solar panels; the second toroidal transformer for injecting a current in the panel bridge lead that is related to the measured voltage; and, the third toroidal transformer for sensing the injected current.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIG. 4 shows operating modes of the system of FIG. 1.

FIG. 5 shows another embodiment of a system including an array of solar panels connected to a converter via bridges.

FIG. 8C shows interconnected panel controller and panel array blocks.

DESCRIPTION OF THE PREFERRED EMBODIMENTS

The disclosure provided herein describes examples of some embodiments of the invention. The designs, figures, and descriptions are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention. Electrical couplings, connections and interconnections refer to direct or indirect connections such that when A is connected to C an intervening device B may be present.

The present invention provides a means for communicating signals within a solar panel array. Embodiments of the invention utilize toroidal transformers in transceivers that inject signals into the solar panel array and that obtain signals from the solar panel array.

Figure 1:
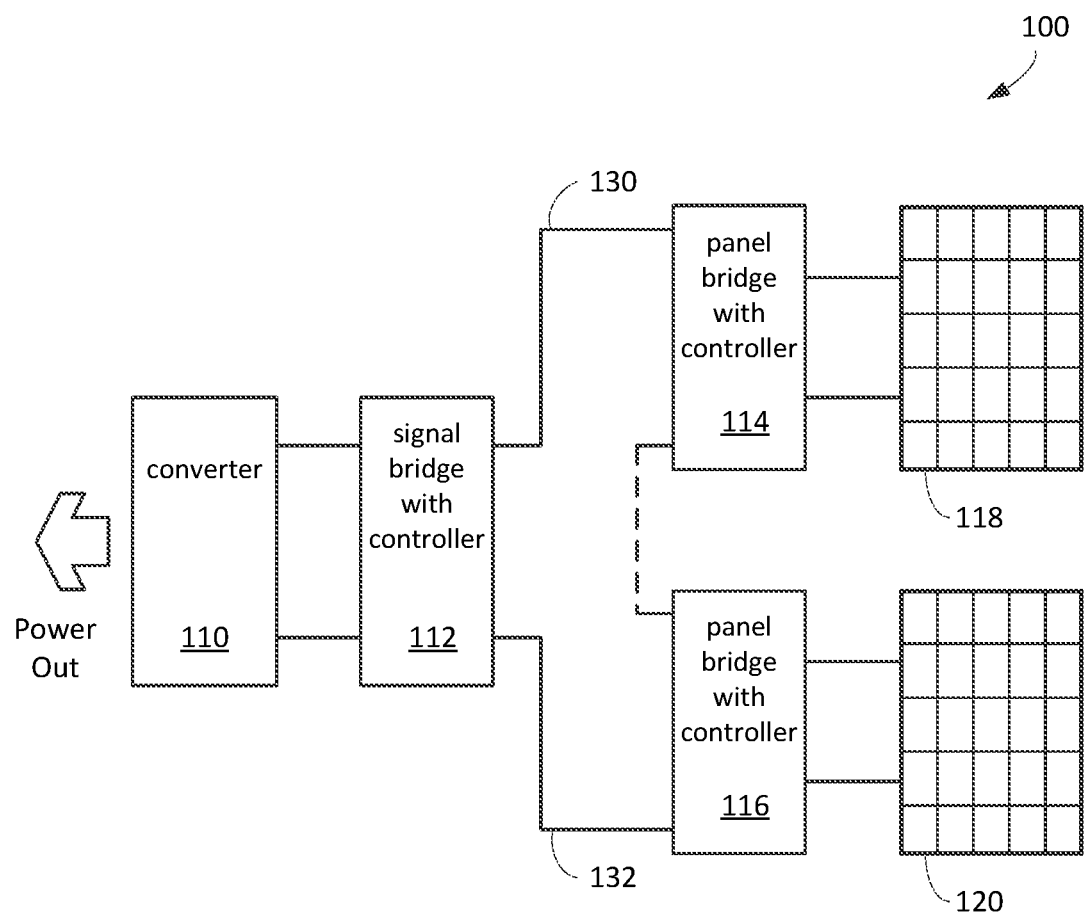
FIG. 1 shows a system including an array of solar panels connected to a converter via bridges.

In FIG. 1, an array of solar panels connected to a converter is shown 100. The solar panels 118, 120 are photovoltaic panels and have a voltage output when in the presence of sunlight.

The solar panels 118, 120 are connected to a power converter 110. The converter may be a DC to AC converter or a DC to DC converter or some combination of the two. As shown, there is but one converter for a multiplicity of panels in this string converter system. Typically, the converter is mounted remotely from the solar panel array.

The solar panels 118, 120 are connected to the converter 110 via bridges. Each of the panels is connected to a signal bridge with controller 112 by a panel bridge with controller 114, 116 and the panel bridges are interconnected. In turn, the signal bridge is connected to the converter 110.

As explained below, it is possible to pass a high frequency signal through the solar panel wiring. In particular, a signal may be passed from the signal bridge 112 to panel bridge 114 and 116 and from the panel bridge to the signal bridge over interconnecting wiring 130. As described, i) the converter to signal bridge interconnect, ii) the signal bridge to panel bridge interconnect, and iii) the solar panel to panel bridge interconnect do not preclude intervening devices. Line 132 interconnects panel bridge 116 with signal bridge 112.

Figure 2A:
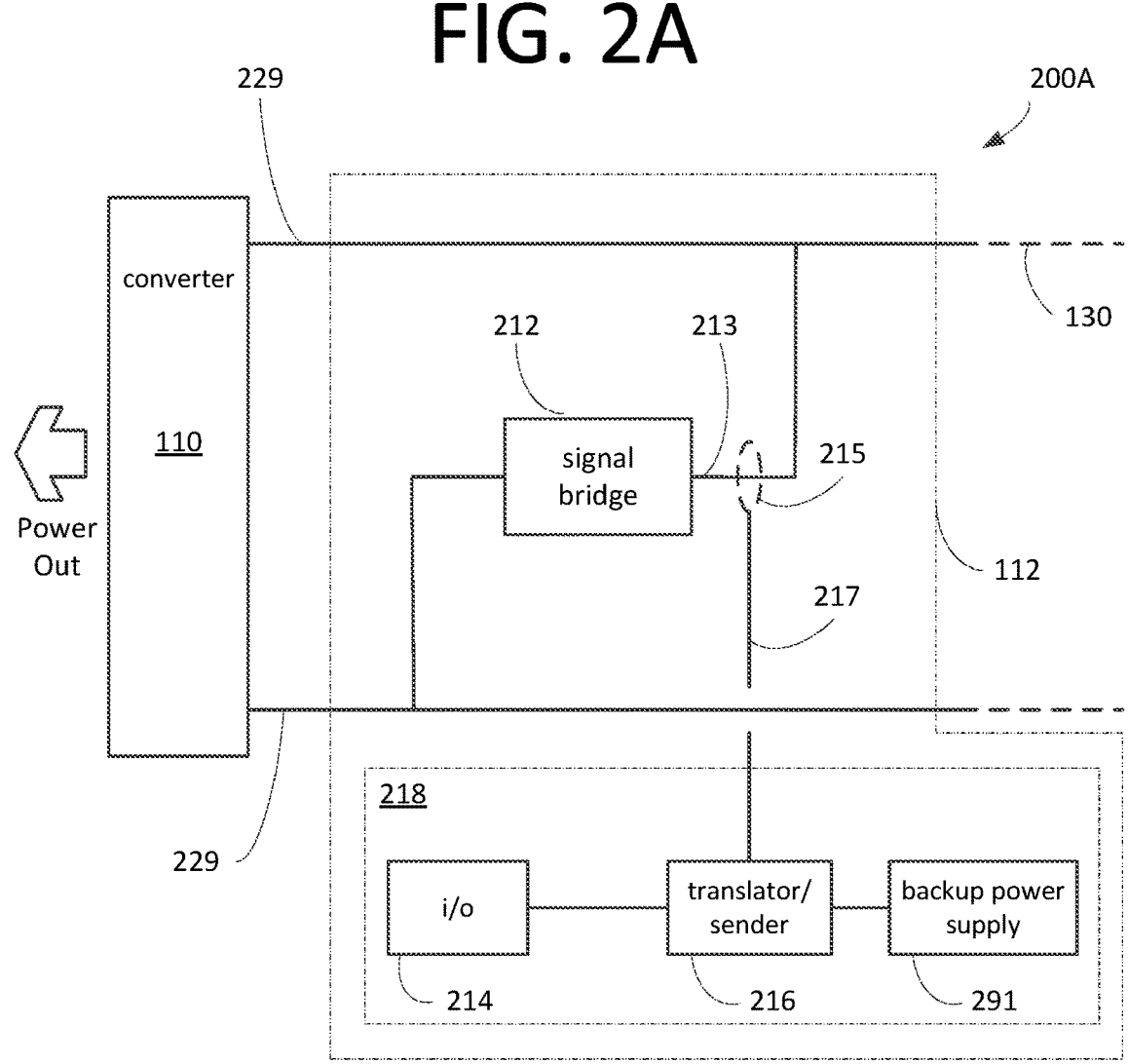
FIG. 2A-D show a converter and signal bridge with controller of the system of FIG. 1.

FIG. 2A shows the converter and a signal bridge with controller 200A. In the figure, a signal bridge 212 is across the inputs 229 of the converter 110. Coupled with a signal bridge lead 213 is a magnetic coupler such as a toroidal transformer 215. Item 291 is an optional backup power supply which may be connected with translator/sender 216.

Signals from the toroidal transformer 217 are passed with or exchanged with a controller. In the controller, a translator/sender 216 translates signals from or sends signals to the toroidal transformer. For example, signals obtained from the signal bridge are translated and sent to the input/output block 214. For example, signals sent to the solar panels 118, 120 may originate at the input/output block 214, be translated, and be passed through the wiring 130 to the panel bridge with controller 114, 116.

Signals are sent when the toroidal transformer 215 injects a current into the signal bridge. These signals may accomplish a number of functions including the function of removing one or more of the solar panels from the circuit. Signals received when the toroidal transformer 215 is excited by a current in the signal bridge provide information about the solar panel array including voltage, current, and temperature.

The signal bridge controller 218 or parts thereof may be implemented in or included in hardwired logic or in multipurpose logic such as an application specific integrated circuit ("ASIC"), a microcontroller, a computer processing unit ("CPU"), or a field programmable gate array ("FPGA").

Figure 2B:
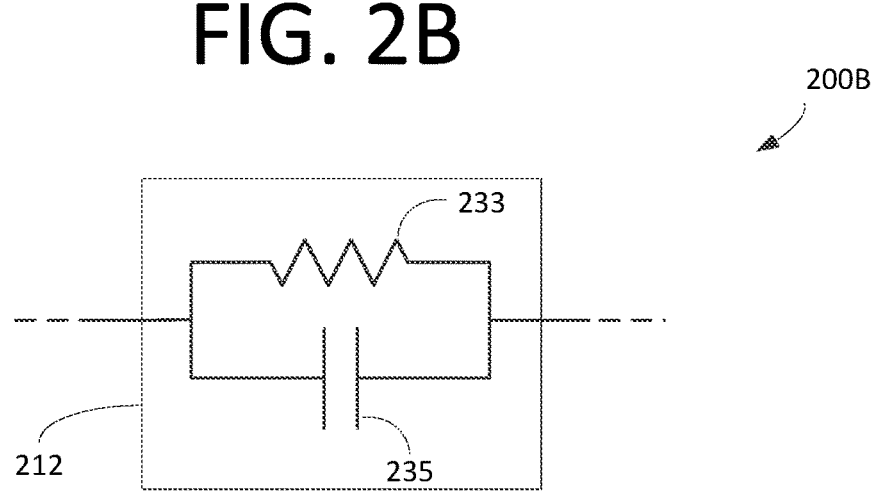

FIG. 2B shows a signal bridge 200B. As shown, the bridge includes a resistor 233 that is in parallel with a capacitor 235. The capacitor provides a communication path for high frequency signals, for example signals in the range of 50.0 to 200.0 kilohertz. The resistor is optional and may provide a means for draining the energy stored in the capacitor.

In an embodiment, values of the capacitor range from 2.0 to 20.0 microfarads. In an embodiment, values of the resistor range from 1.0 to 10.0 megaohms.

Figure 2C:
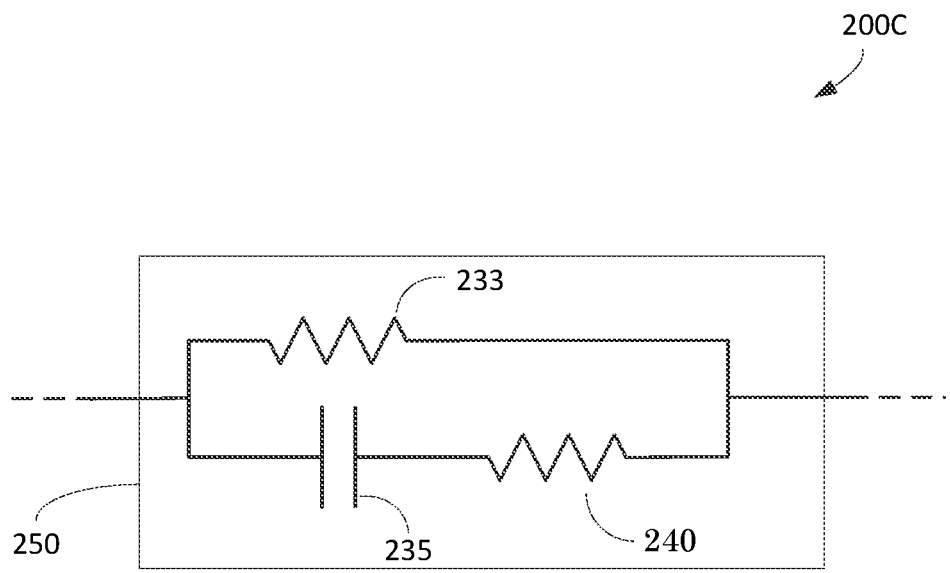

FIG. 2C shows a signal bridge 200C. As shown, the bridge includes a capacitor 235 in series with a resistor 240 (a first network) and the first network in parallel with a resistor 233. Values are similar to those above for the capacitor 235 and the resistor 233. The value of the second resistor 240 is small compared with the value of resistor 233. In an embodiment, the value of the second resistor is 1 to 10 ohms. The signal bridge 250 may be substituted for signal bridge 212. The signal bridge 250 may be substituted for the signal bridge 342 in FIG. 3B.

Figure 2D:
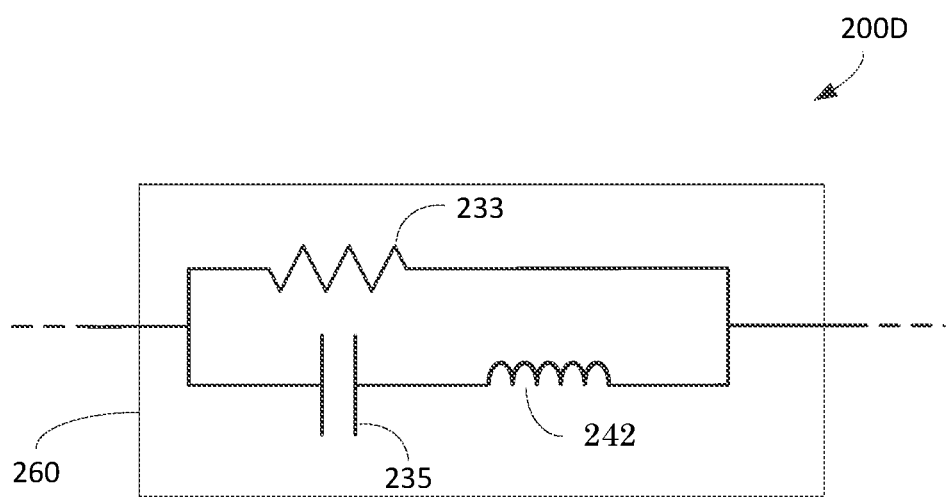

FIG. 2D shows a signal bridge 200D. As shown, the bridge includes a capacitor 235 in series with an inductor 242 (a second network) and the second network in parallel with a resistor 233. Values are similar to those above for the capacitor 235 and the resistor 233. The value of the inductor 242 is small. In an embodiment, the value of the inductor is 1 to 1,000 nH. The signal bridge 260 may be substituted for the signal bridge 212. The signal bridge 260 may be substituted for the signal bridge 342 in FIG. 3B.

Figure 3A:
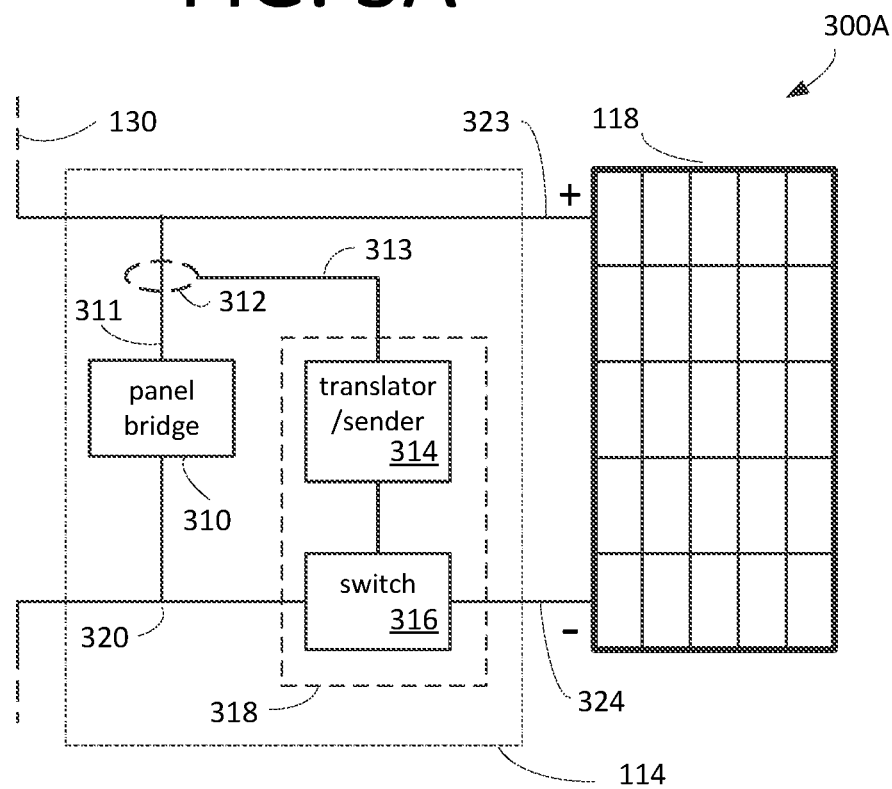
FIG. 3A-D show a panel bridge with controller and solar panel of the system of FIG. 1.

Typical of the panel bridge with controllers 114, 116 is FIG. 3A which shows a solar panel connected to a panel bridge with controller 300A.

As seen in FIG. 3A, the panel bridge with controller 114 is in the circuit with the solar panel 118. The panel bridge with controller 114 includes a panel bridge 310 which is connected across the outputs 323, 324 of the solar panel 118. Coupled with a panel bridge lead 311 is a magnetic coupler such as a toroidal transformer 312.

A disconnect device such as a switch or a plurality of switches 316 is in an output of the solar panel such as a negative output 324 of the solar panel 118. In an embodiment, the disconnect device or one of the switches is between the solar panel and the connection 320 with the panel bridge 310.

Signals arriving at the toroidal transformer 312 are passed to the controller 318. In the controller, a translator/sender 314 translates the signals and passes them on. Where the signals are passed to a switch 316, a change in the received toroidal signal may change the state of the switch. For example, the change may be a logic 0 or 1. For example, the change may be a string of logic such as a string of logic that forms a logical word or logical words.

Signals leaving the toroidal transformer 312 are passed from the translator/sender 314 in the controller 318 to the toroidal transformer 312. Injected into the panel lead 311 by the toroidal transformer 312, the signals are conducted by the wiring 130 to the signal bridge at the converter.

The translator/sender 314 or parts thereof may be implemented in or included in hardwired logic or in multipurpose logic such as an application specific integrated circuit ("ASIC"), a microcontroller, a computer processing unit ("CPU"), or a field programmable gate array ("FPGA").

Figure 3B:
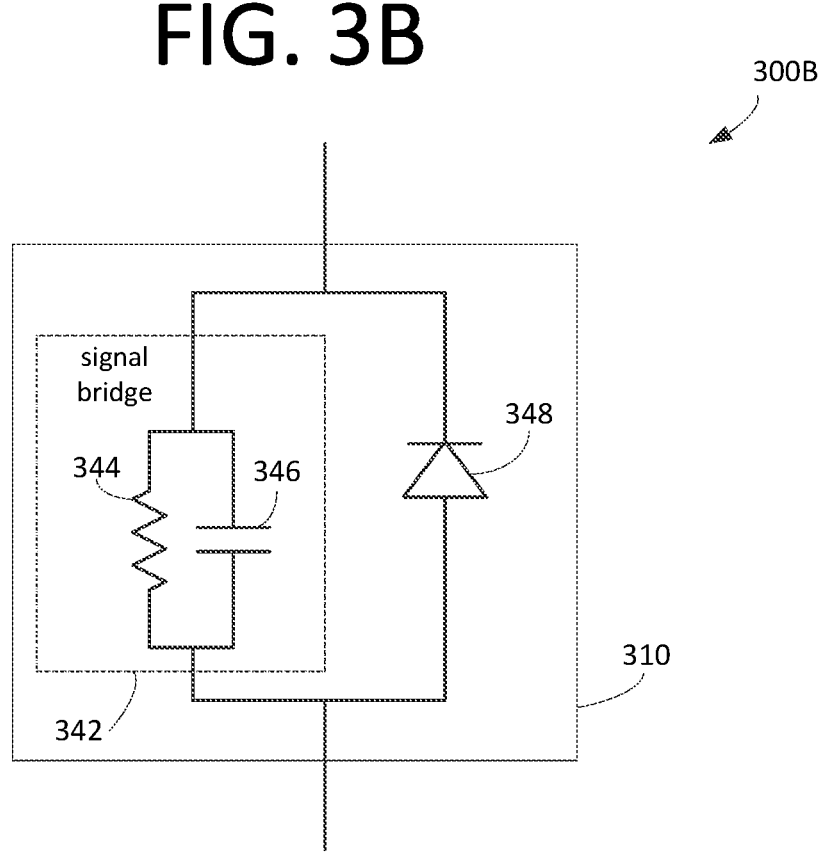

FIG. 3B shows the panel bridge 300B. The panel bridge 310 includes a signal bridge 342 in parallel with a diode 348. The signal bridge includes a capacitor 346 in parallel with a resistor 344.

In an embodiment, values of the capacitor 346 range from 2.0 to 20.0 microfarads. In an embodiment, values of the resistor 344 range from 1.0 to 10.0 megaohms. In an embodiment, the diode is an 80V, 15 Amp, Schottky diode.

Figure 3C:
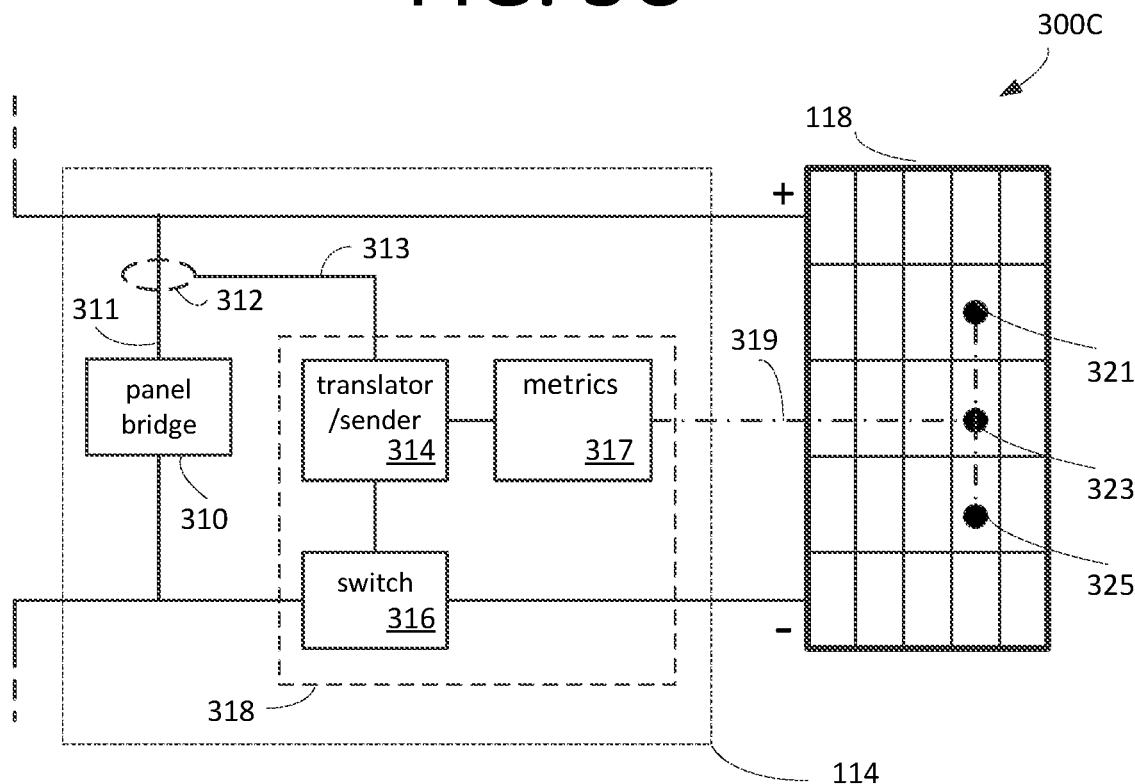

FIG. 3C shows a solar panel connected to a panel bridge in another configuration 300C. In this embodiment the controller 318 includes a metrics module such as a metric module 317 connected to the translator/sender 314 for exchanging signals with the translator/sender. The metrics may include measures associated with the solar panel or solar panel performance. Signals including signals from transducers may originate at the metrics module and signals including signals from transducers may be sent to the metrics module.

The metrics module 317 may be in the controller 318 and/or in the solar panel 118. The metrics module 317 may have electrical connections 319 to the panel or to sensors in the panel such as electrical connections to a temperature sensor 321, a current sensor 323, and a voltage sensor 325.

Figure 3D:
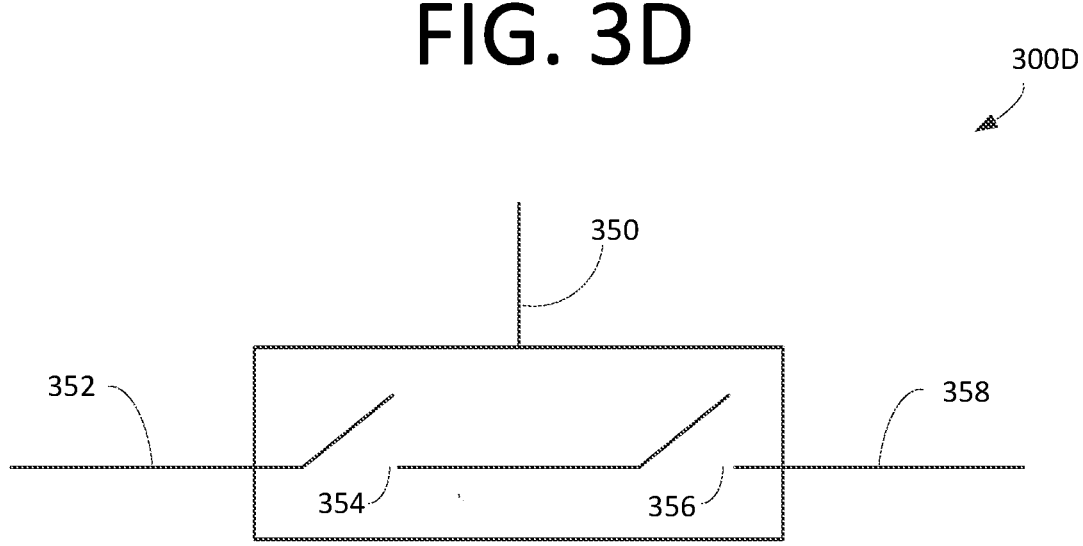

FIG. 3D shows a disconnect device 300D. The disconnect device may include one or more switches (two shown) and the switches may be ganged or not. In an embodiment, two switches 354, 356 are ganged such that an appropriate signal input to the switch 350 either opens both of the switches (352 is disconnected from 358 twice) or closes both of the switches (352 is connected to 358). As skilled artisans will appreciate, certifying bodies such as Underwriters Laboratories may require that solar panel disconnects be redundant.

FIG. 4 shows communications via the toroidal transformers 400. In a first operating mode, safety signals are passed from the converter toroid 215 to the panel toroid 312. Here, the converter toroid 215 injects a signal at or near the converter 110 and the panel toroid 312 receives the signal at the panel 118 to change the state of the switch 316.

In a second operating mode, metrics are passed from the panel toroid 312 to the converter toroid 215. Here, the panel toroid 312 injects a signal at or near the panel 118 and the converter toroid 215 receives the signal at the converter 110 to convey information to the translator sender 216 and to the i/o 214. For example, where temperature information from the temperature sensor 321 is conveyed, the translator/sender may provide a translation of the signal and the i/o may utilize directly or indirectly the translated signal in managing the solar array.

Figure 6A:
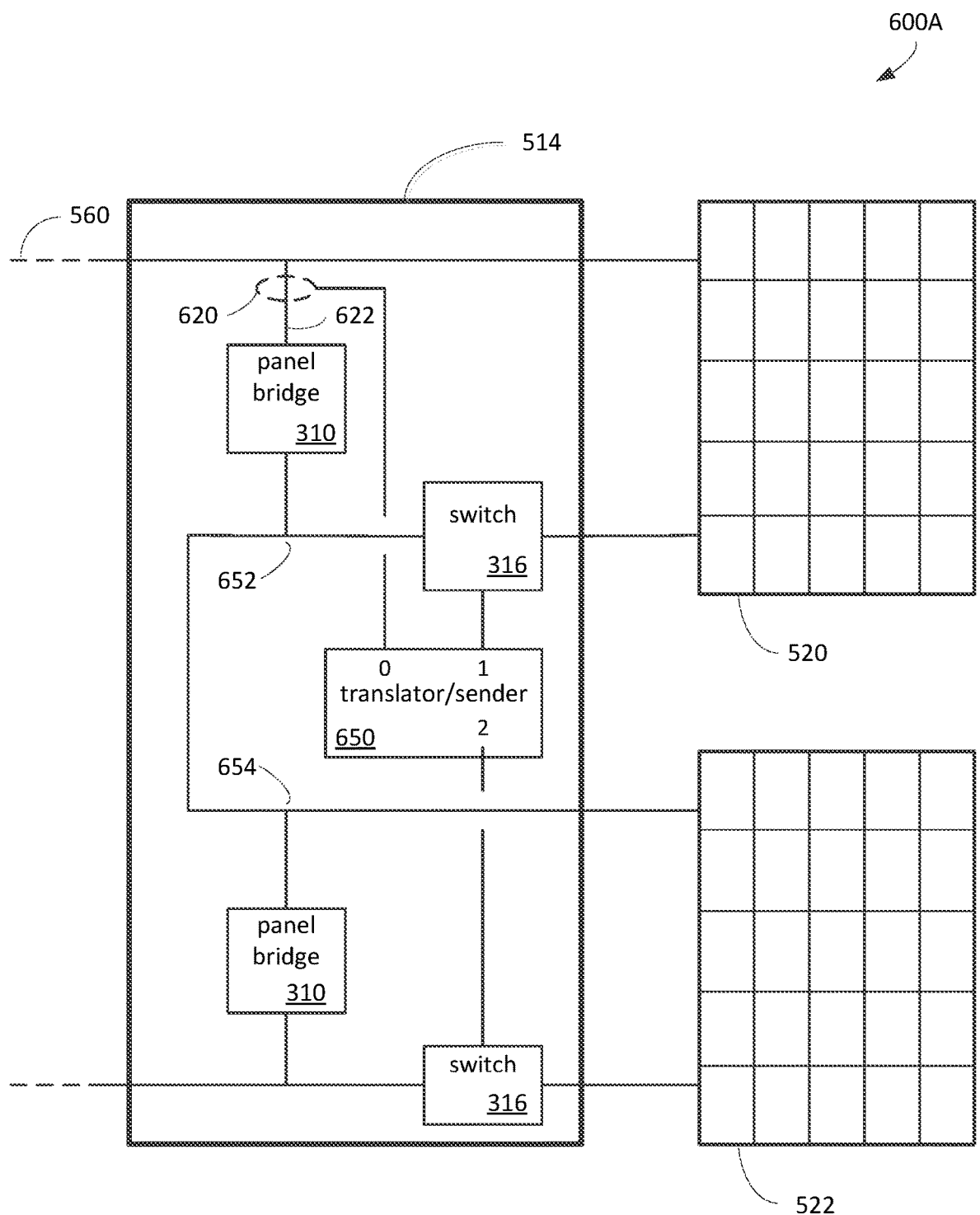
FIG. 6A-B show a panel bridge with controller connected to a plurality of solar panels of the system of FIG. 5.

FIGS. 5-6A-B show other embodiments of solar panel communications systems 500, 600A-B.

FIG. 5 shows another embodiment of a solar panel array connected to a converter. In the figure a converter 110 is connected to four or more solar panels 520, 522, 524, 526.

A signal bridge with controller 112 is connected between the converter 110 and panel bridges with controllers 514, 516 and wiring 560 connects the signal and panel bridges. The panel bridge with controller 514 interconnects the signal bridge with controller 112 and solar panels 520, 522. The panel bridge with controller 516 interconnects the signal bridge with controller 112 and solar panels 524, 526. As described, i) the converter to signal bridge interconnect, ii) the signal bridge to panel bridge interconnect and iii) the solar panel to panel bridge interconnect do not preclude intervening devices.

Signals from the signal bridge with controller 112 reach the panel bridge with controller via the wiring 560. Typical of a panel bridge with controller 514, 516 is the panel bridge with controller 514 of FIG. 6A.

As seen in the FIG. 6A, a single translator/sender 650 interconnects with two switches 316 that are for removing panels 520, 522 from the circuit. Coupled with a panel bridge lead 622 is a magnetic coupler such as a toroidal transformer 620 that is for exchanging signals with terminal 0 of the translator/sender. For example a signal that opens or closes the switches 316 via the translator/sender terminal 1, 2 connections with the switches.

The first panel bridge 310 is across the outputs of the first solar panel 520 and a second panel bridge 310 is across the outputs of a second solar panel 522. In an embodiment, the switches 316 are between the panels 520, 522 and the panel bridge lead connection 652, 654.

In the first solar panel 520 circuit, the switch 316 provides a means for disconnecting/connecting the solar panel from the circuit. In the second solar panel 522 circuit, a second switch 316 provides a means for disconnecting/connecting the solar panel from the circuit.

Figure 6B:
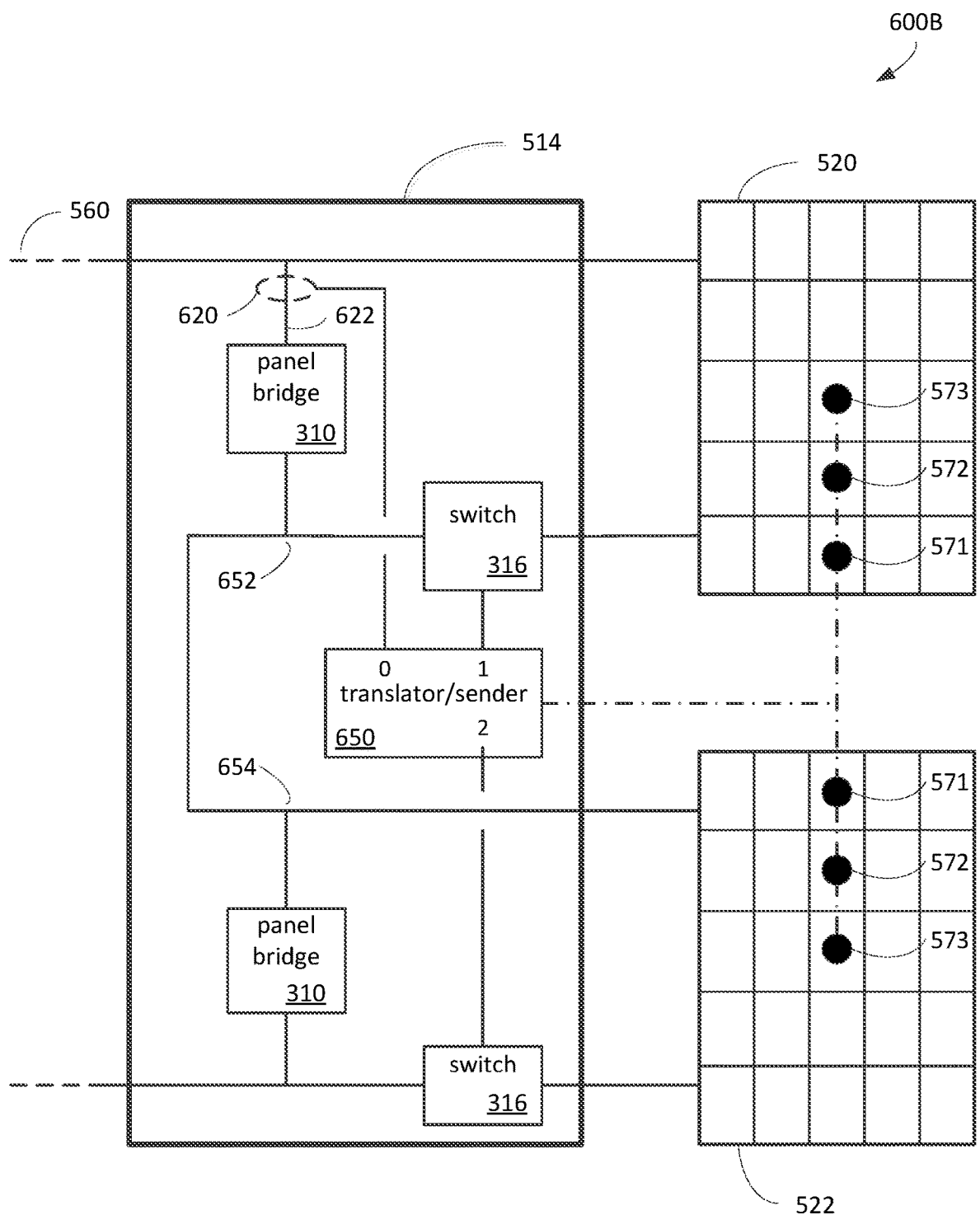

Also typical of a panel bridge with controller 514, 516 is the panel bridge with controller 514 of FIG. 6B.

As seen in the FIG. 6B, a single translator/sender 650 interconnects with two switches 316 and with transducers for each panel. In various embodiments the translator/sender 650 includes a metrics block as shown in FIG. 3C annotated item 317. The transducers may be for temperature 571, for current 572 and for voltage 573.

The first panel bridge 310 is across the outputs of the first solar panel 520 and a second panel bridge 310 is across the outputs of a second solar panel 522. In an embodiment, the switches 316 are between the panels 520, 522 and the panel bridge lead connection 652, 654.

Coupled with a panel bridge lead 622 is a magnetic coupler such as a toroidal transformer 620 that is for exchanging signals with terminal 0 of the translator/sender. For example a signal that opens or closes the switches 316 via the translator/sender terminal 1, 2 connections with the switches. For example signals that provide the signal bridge 112 with panel management information such as temperature, current, and voltage.

In other embodiments of the panel bridge with controller, a single translator/sender may interconnect with three, four, or more switches 316 and with transducers for each panel. These embodiments utilize a similar architecture to that of FIG. 6A.

Panel bridge designs other than the panel bridge design of FIG. 3A and FIG. 6A may be used.

Figure 7A:
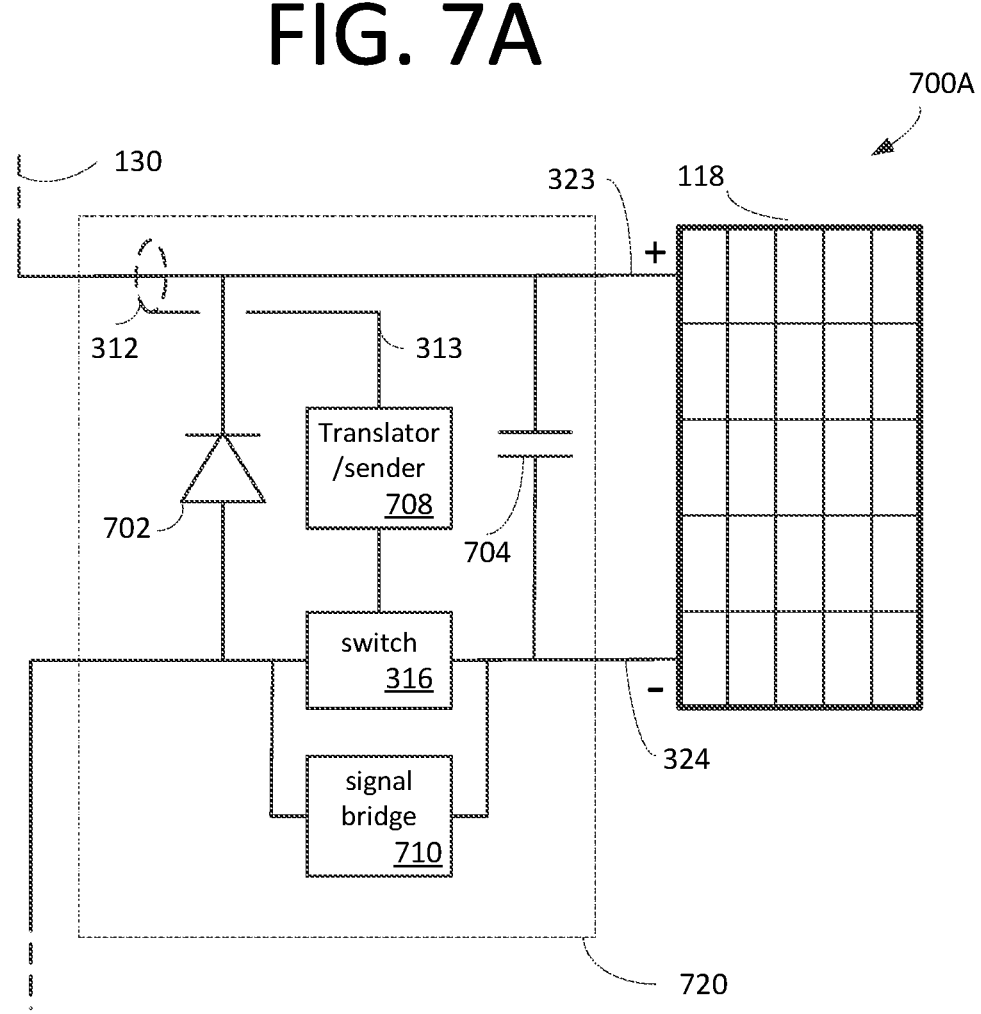
FIG. 7A-B show alternative panel bridge with controller designs.

FIG. 7A shows an alternative panel bridge and controller design 700A. In the alternative panel bridge and controller design a capacitor 704 and a diode 702 are across solar panel 118 outputs 323, 324. In the negative solar panel output and between the capacitor 704 and the anode of the diode 702 is a switch 316. Across the switch is a signal bridge 710. The signal bridge is a capacitor network such as 200B, 200C, 200D.

A magnetic coupling such as a toroidal transformer 312 is for injecting currents and for sensing currents flowing in the positive solar panel output lead 323. In particular, the magnetic coupling is located adjacent to the cathode connection of the diode 702 in the wiring 130 that connects with the converter. The toroidal transformer 312 is connected 313 to a translator/sender 708 which is in turn connected to the switch 316.

Signals that originate at the signal bridge near the converter are conducted by the wiring 130 to the panel bridge, are translated and affect, for example, switch state. Signals that originate at the panel bridge near the panel are conducted by the wiring 130 to the signal bridge, are translated and provide, for example, performance of the panel.

The panel bridge and controller alternative 720 may be substituted for the panel bridge and controller 114 and 116 of FIG. 1.

Figure 7B:
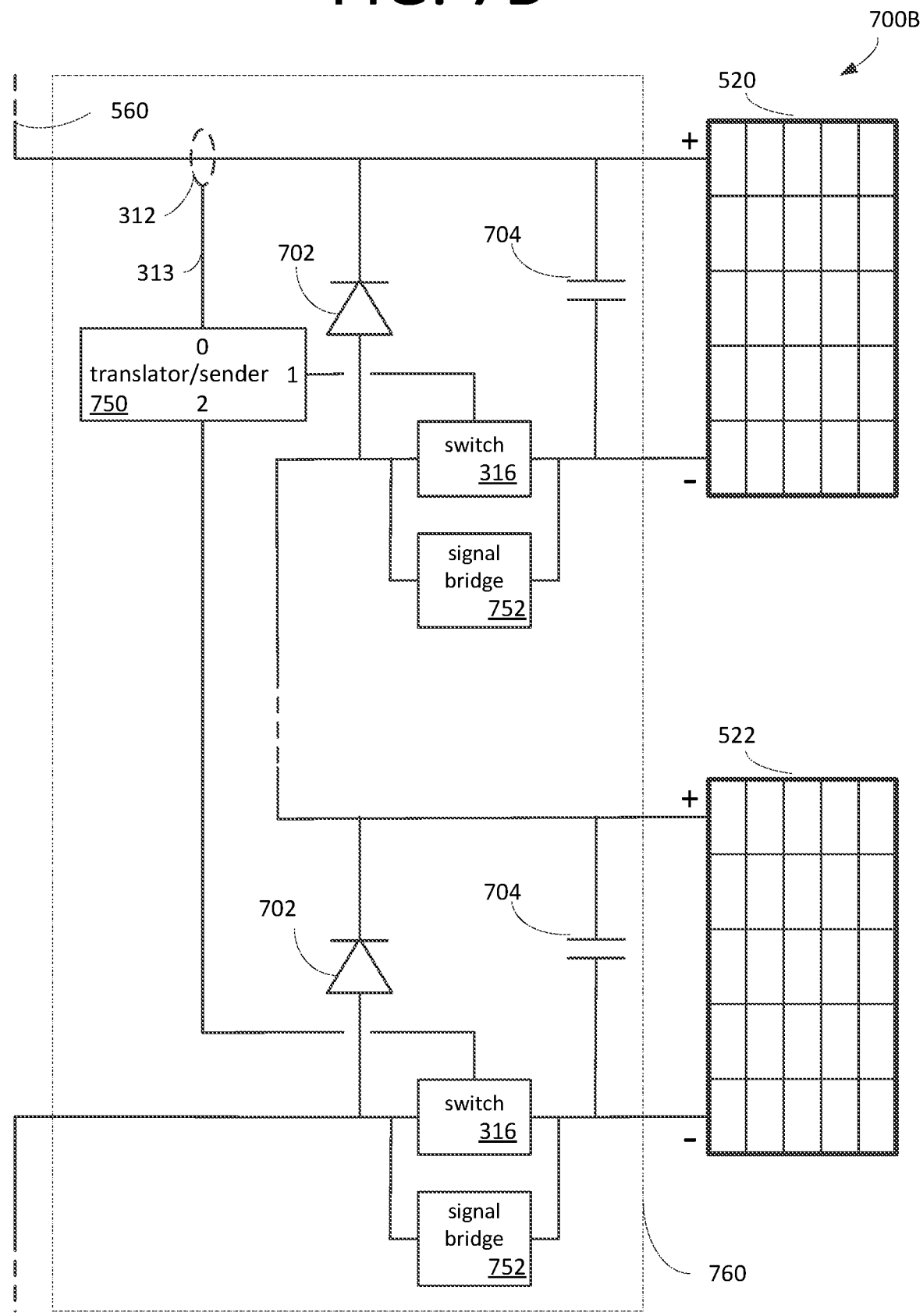

FIG. 7B shows an alternative panel bridge and controller design 700B. In the alternative panel bridge and controller design two solar panels are connected together.

With the first solar panel 520, a capacitor 704 and a diode 702 are across the outputs of the panel 520. In the negative solar panel output and between the capacitor 704 and the anode of the diode 702 is a switch 316. Across the switch is a signal bridge 752. The negative solar panel output lead of the first panel is connected to the positive output lead of a second solar panel 522.

With the second solar panel 522, a capacitor 704 and a diode 702 are across the outputs of the panel 522. In the negative solar panel output and between the capacitor 704 and the anode of the diode 702 is a switch 316. Across the switch is a signal bridge 752. The signal bridge is a capacitor network such as 200B, 200C, 200D.

A magnetic coupling such as a toroidal transformer 312 is for injecting currents and for sensing currents flowing in the positive solar panel output lead of the first panel. In particular, the magnetic coupling is located adjacent to the cathode connection of the diode 702 in the wiring 560 that connects with the converter.

As seen, the toroidal transformer 312 is connected 313 to the translator/sender 750 at terminal 0. Terminal 1 of the translator/sender connects to the switch 316 at the first panel 520 and terminal 2 of the translator/sender connects to the switch 316 at the second panel 522.

Signals that originate at the signal bridge near the converter are conducted by the wiring 560 to the panel bridge, are translated and affect, for example, switch state in two switches. Signals that originate at the panel bridges near the panels are conducted by the wiring 560 to the signal bridge, are translated and provide, for example, performance of the panels.

The panel bridge and controller alternative 760 may be substituted for the panel bridge and controller 514 and 516 of FIG. 5.

Figure 8A:
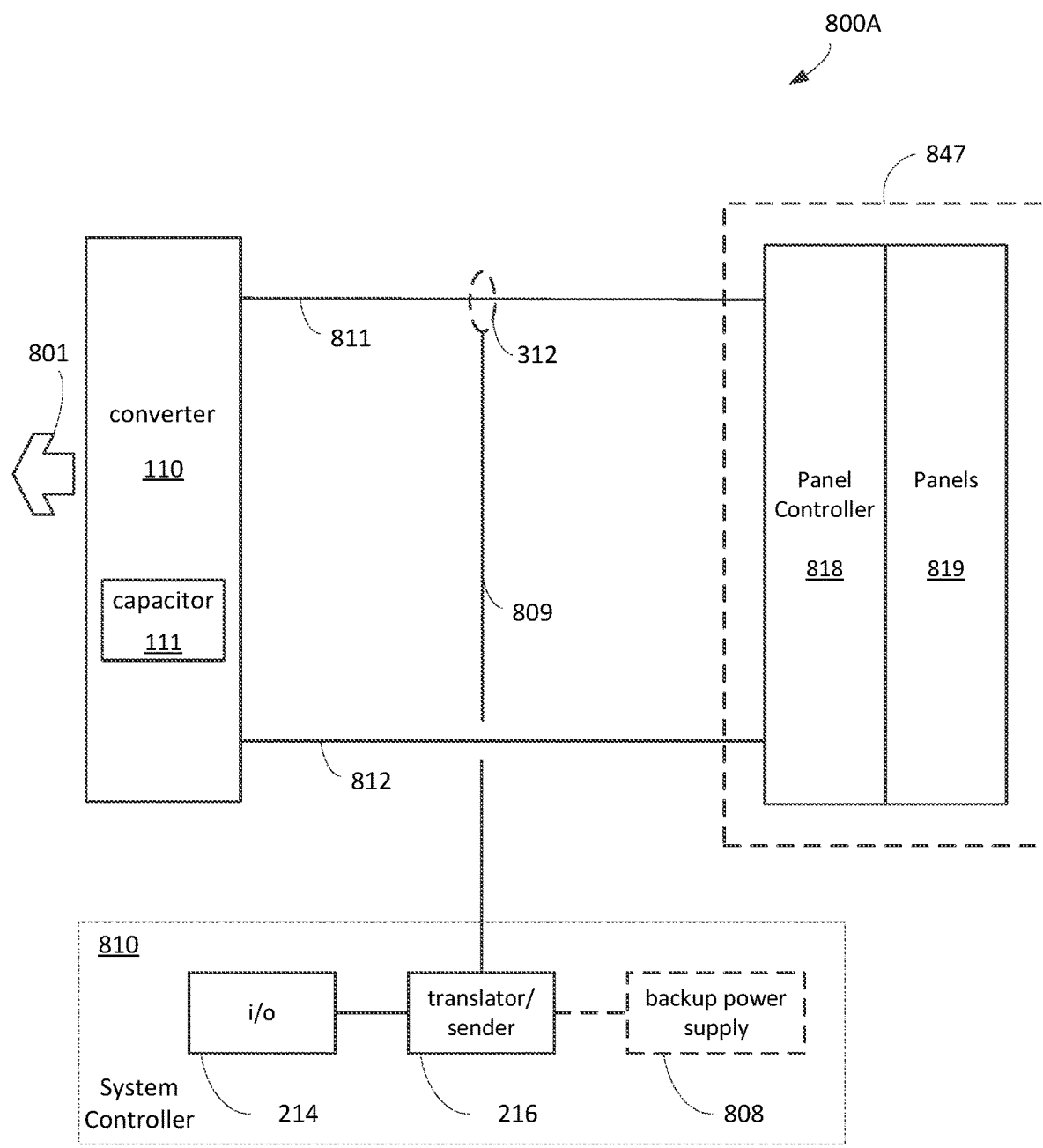
FIGS. 8A-B show a system controller and panel controller connected to n panels.
Figure 8B:
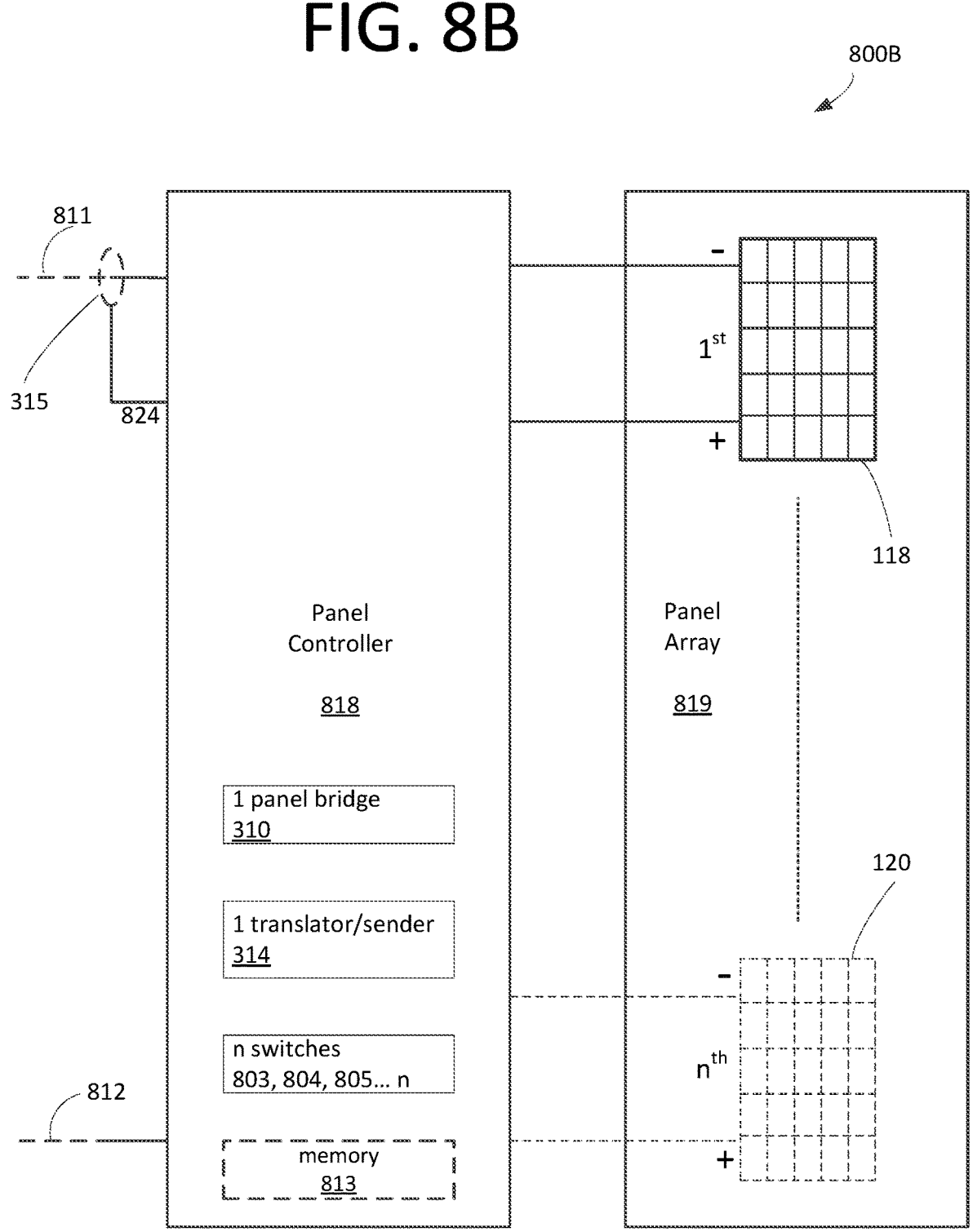

FIGS. 8A-B show another embodiment of a solar panel communications system 800A-B.

In FIG. 8A, a converter 110 has a connection 801 which may be an output connection such as an AC output connection to an AC grid interconnected with other AC sources. The converter input connection may be a DC connection. Converter input conductors or lines 811, 812 interconnect with a panel block 847 including a panel controller 818 and/or a panel array 819. Some embodiments of the converter include a capacitor 111 such as a capacitor coupled across converter inputs. The capacitor may provide a current path via conductors 811, 812. The capacitor may provide a current path through the converter 110 and a panel bridge of the panel controller (e.g., see FIG. 8D).

A current sensor/injector 312 such as a toroidal current transformer is proximate to or magnetically coupled to one of the converter lines 811, 812. The current sensor/injector is connected to a system controller 810 which may include any of an i/o device 214 and a translator/sender 216. The translator/sender 216 may include memory such as semiconductor memory or involatile semiconductor memory and the memory may store values such as alarm values.

The system controller may be powered by alternating current (AC). The system controller may be interconnected with or may include a backup power supply 808 such as an AC or DC backup power supply. An AC backup power supply may provide power when, for example, a converter output connection to an AC source is lost or degraded. Thus, the backup power supply may enable operation of the system controller when no or insufficient AC power from an AC grid or supply is available at the converter output connection 801.

The current/sensor injector 312 is coupled to the translator/sender 216 via line 809. In some embodiments, the i/o device 214 and the backup power supply 808 interconnect with the translator/sender.

FIG. 8B shows a panel controller coupled to a panel array 800B. As mentioned, the panel controller 818 interconnects with the converter lines 811, 812. A second current sensor/injector 315 is shown proximate to conductor 811 between the first current sensor/injector 312 and the panel controller 818. The second current sensor/injector interconnects via line 824 with the panel controller. The panel controller interconnects with one or more (1 . . . n) panels, for example panels 118, 120, in a panel array 819.

In various embodiments the panel controller 818 includes one or more of panel bridge(s) 310, translator/sender(s) 314, and switch(es) 803 . . . , for example switch(es) for disconnecting the panels 118, 120 from the converter 110. In an embodiment, the panel controller includes one panel bridge, one translator/sender, and n switches for switching n panels.

In some embodiments the panel controller 818 includes or is interconnected with a memory device 813, for example semiconductor memory or involatile semiconductor memory. Where all n switches may be commanded to open or close in unison, the memory may indicate and/or enable the switches to maintain and/or resume the last commanded switch state.

The panel controller 818 may be powered AC or DC power. In an embodiment the panel is powered by DC (direct current) power. The DC power may be derived from the panels 118, 120. Here, while the panels are exposed to sunlight and while the panels generate adequate power the panel controller is operable.

In an embodiment, sufficient panel power and memory 813 may enable the switches 803 . . . to maintain the last commanded switch state. Where memory 813 such as involatile memory is used, the switches may regain the last commanded switch state after a loss of panel power.

In an embodiment, the backup power supply 808 may enable the system controller 810 to transmit commands or exchange information which may include system controller commands and panel metrics via communications between the first and second current sensors/injectors 312, 315 when a converter output connection to a power source such as an AC power source is lost or degraded. In some embodiments power available from the panels (e.g., 118, 120) can be disconnected from the converter 110 despite a lost or degraded converter output connection 801 to a power source. In some embodiments, power available from the panels can be disconnected from the converter 110 when the system controller 810 detects a lost or degraded converter output connection to an AC source and here the system controller 810 using the backup power supply 808 may transmit a disconnect command to panel controller(s).

FIG. 8C shows converter inputs connected to multiple panel blocks 800C. As seen, panel block 847 is interconnected in series 817 with panel block 849. Further, one or more additional panel blocks may have similar series connections between panel block 847 and 849.

Figure 8D:
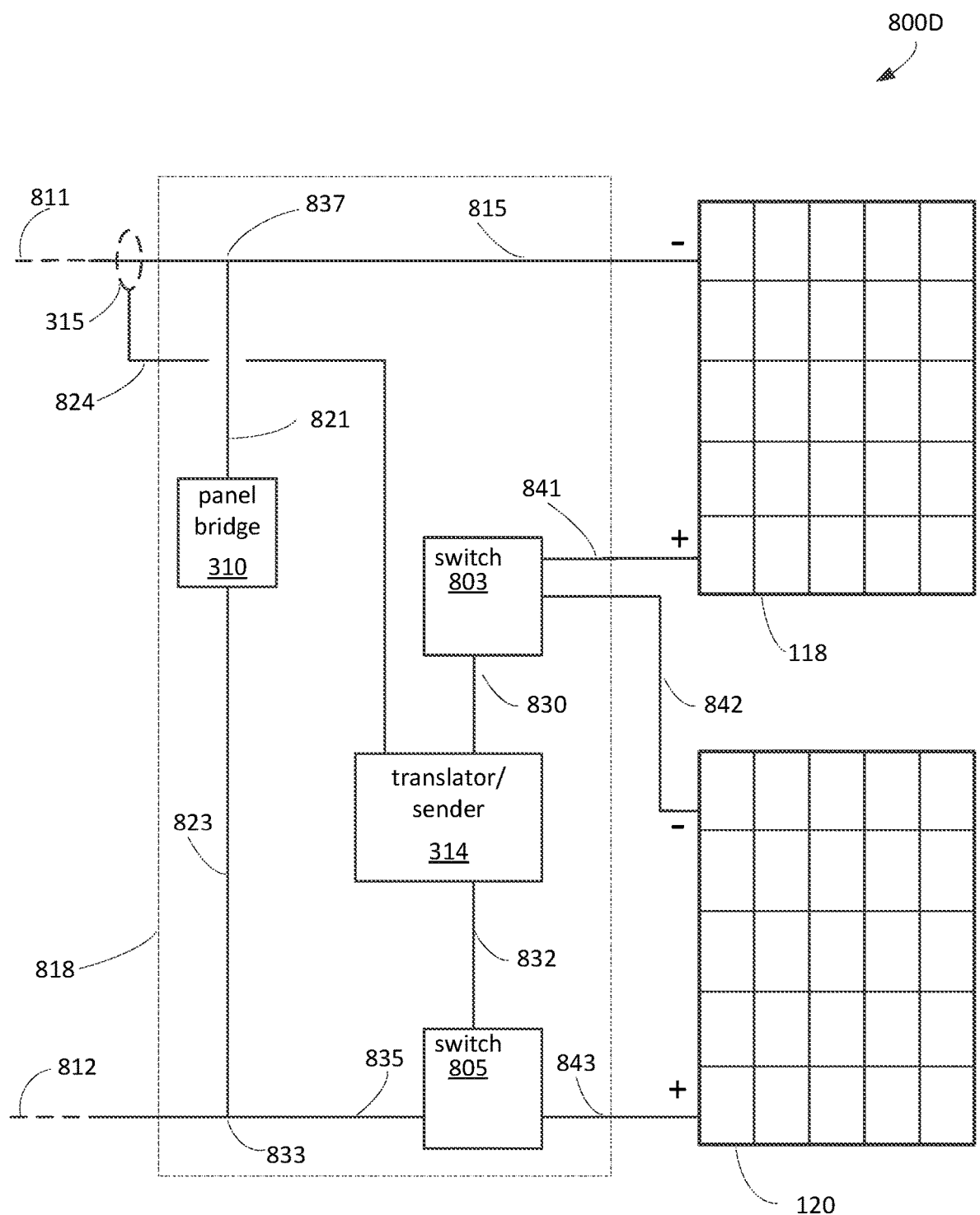
FIGS. 8D-F show a panel controller connected to varying numbers of panels.

FIG. 8D shows a panel controller coupled to two panels 800D. Here, panel controller 818 includes a panel bridge 310, a translator sender 314 and two switches 803, 805 for interconnection with two panels 118, 120. The panel bridge interconnects converter input lines 811, 812. Translator/sender line 830 interconnects with switch 803, translator sender line 832 interconnects with switch 805, and translator/sender line 824 interconnects with the second current sensor/injector 315.

The first switch 803 makes a series connection 841, 842 to selectively interconnect the two panels according to commands received from the translator/sender 314 via line 830. The second switch 805, via lines 835 and 843, interconnects the second panel 120 and a junction 833 of panel bridge line 823 and converter line 812. Lines 811 and 821 interconnect at a junction 837. This junction and the first panel 118 are interconnected by line 815.

Translator/sender 314 is interconnected with current sensor/injector 315 in order to receive commands from the system controller and/or to exchange information which may include commands with the system controller 810. Notably, the translator/sender 314 may receive information and/or commands from interconnected switches and/or panels.

Figure 8E:
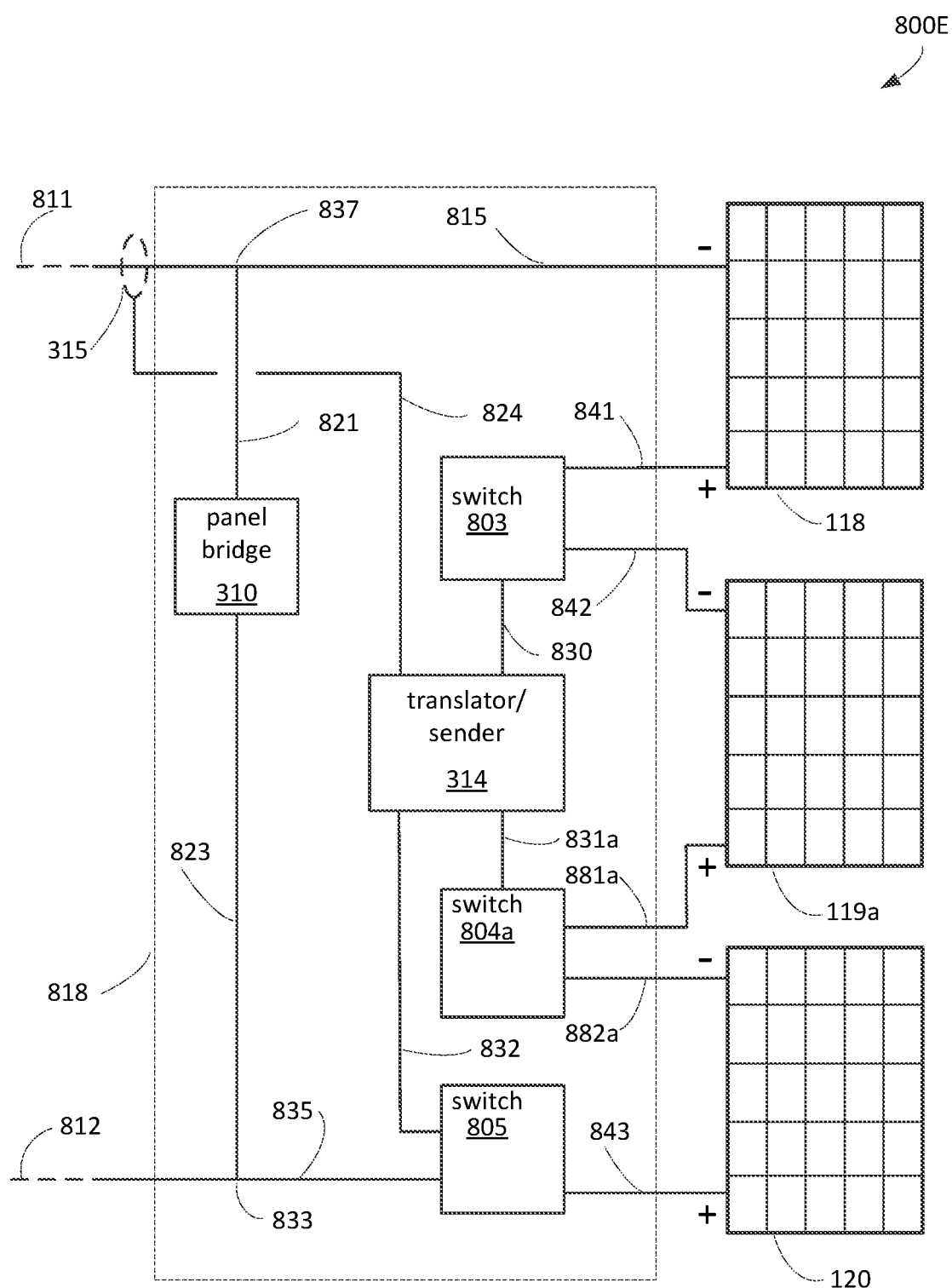

FIG. 8E shows a panel controller coupled to three panels 800E. Here, panel controller 818 includes a panel bridge 310, a translator sender 314 and three switches 803, 804a, 805 for interconnection with three panels 118, 119a, 120. The panel bridge interconnects converter input lines 811, 812. Translator/sender line 830 interconnects with switch 803, translator sender/line 831a interconnects with switch 804a, translator sender line 832 interconnects with switch 805, and translator/sender line 824 interconnects with the second current sensor/injector 315.

The first switch 803 makes a series connection 841, 842 to selectively interconnect panels 118, 119a according to commands received from the translator/sender 314 via line 830. The second switch 804a makes a series connection 881a, 882a to selectively interconnect panels 119a, 120 according to commands received from the translator sender via line 831a.

The third switch 805, via lines 835 and 843, interconnects the third panel 120 and a junction 833 of panel bridge line 823 and converter line 812 according to commands received from the translator sender via line 832.

Translator/sender 314 is interconnected with the second current sensor/injector 315 in order to exchange information and/or commands with the system controller 810. The translator/sender may receive information and/or commands from interconnected switches and/or panels.

Figure 8F:
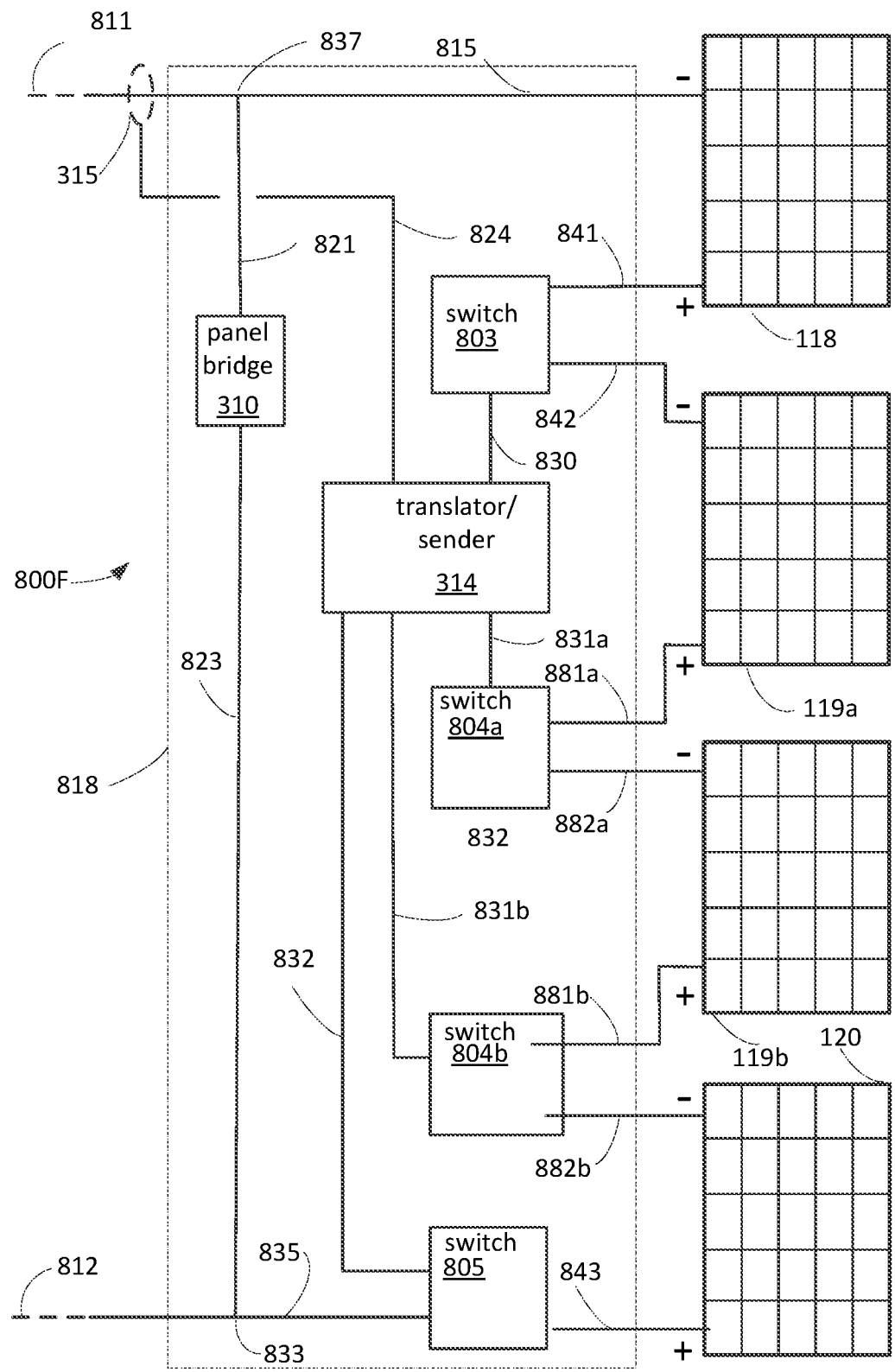

FIG. 8F shows a panel controller coupled to four panels 800F. Here, panel controller 818 includes a panel bridge 310, a translator sender 314 and four switches 803, 804a, 804b, 805 for interconnection with four panels 118, 119a, 119b, 120. The panel bridge interconnects converter input lines 811, 812. Translator/sender line 830 interconnects with switch 803, translator sender/line 831a interconnects with switch 804a, translator/sender line 831b interconnects with switch 804b, translator/sender line 832 interconnects with switch 805, and translator/sender line 824 interconnects with the second current sensor/injector 315.

The first switch 803 makes a series connection 841, 842 to selectively interconnect panels 118, 119a according to commands received from the translator/sender 314 via line 830. The second switch 804a makes a series connection 881a, 882a to selectively interconnect panels 119a, 119b according to commands received from the translator sender via line 831a. The third switch 804b makes a series connection 881b, 882b to selectively interconnect panels 119b, 120 according to commands received from the translator sender via line 831b.

The fourth switch 805, via lines 835 and 843, interconnects the fourth panel 120 and a junction 833 of panel bridge line 823 and converter line 812 according to commands received from the translator sender via line 832.

Translator/sender 314 is interconnected with the second current sensor/injector 315 in order to exchange information and/or commands with the system controller 810. The translator/sender may receive information and/or commands from interconnected switches and/or panels.

Figure 8G:
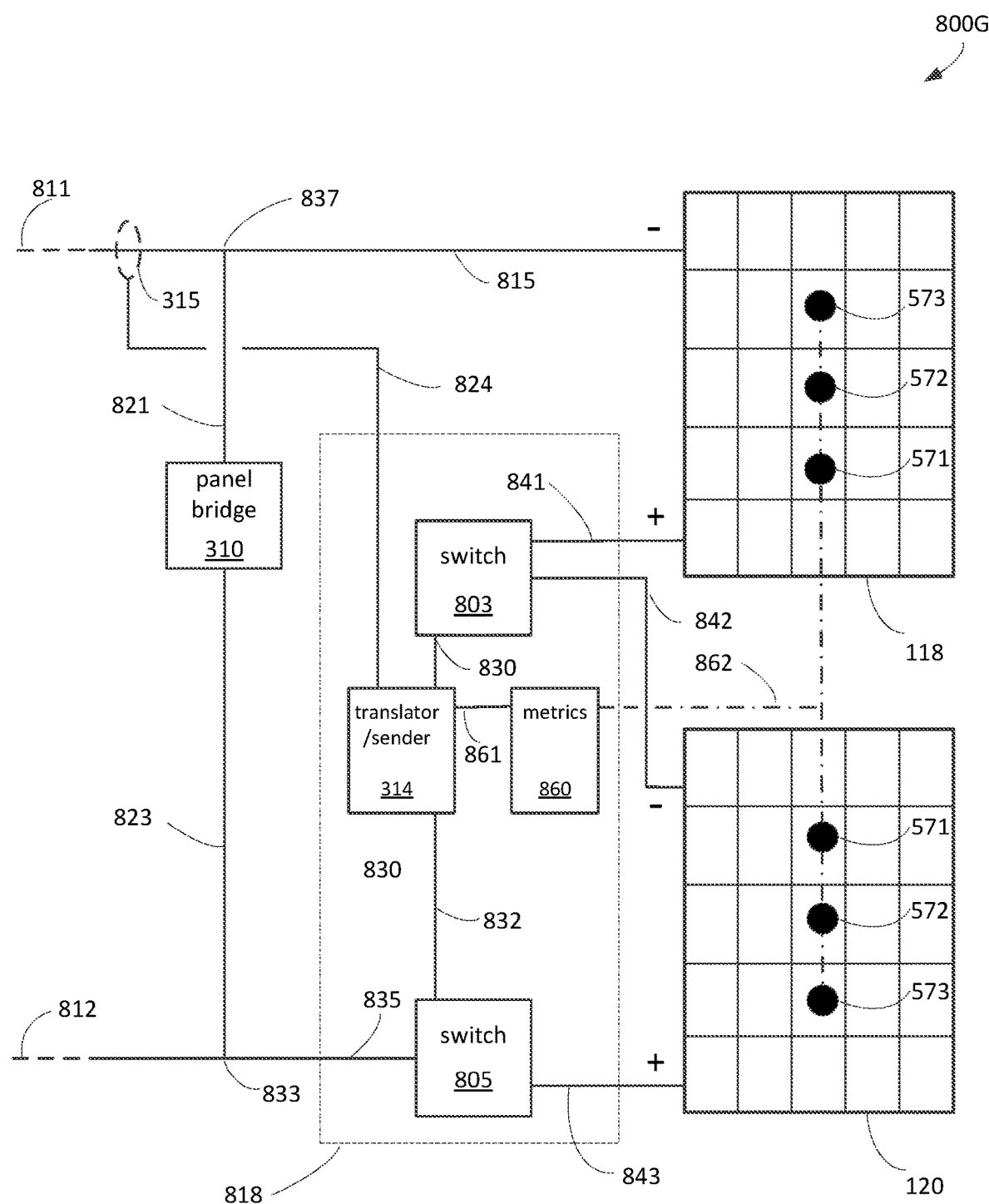
FIG. 8G shows a panel controller including a metrics block interconnected with panel sensors or transducers.

FIG. 8G shows yet another embodiment that further includes panel metrics 800G. Here, a metrics block 860 connects transducers/sensors such as panel mounted transducers with the translator/sender 314 which may communicate these metrics to any one or more of the system controller 810, the panel controller 818, a translator/sender 216, 314, and the i/o block 214. Line 861 may interconnect the translator/sender 314 with the metrics block 860. Line or lines 862 may interconnect the transducers/sensors and the metrics block. The metrics block may provide one or more of signal conditioning and scaling of transducer/sender signals. The metrics block may provide one or more of comparisons of transducer/sender signals or conditioned or scaled values of these signals with values or alarm values stored within the metrics block, stored within the panel controller 818, or stored within the system controller 810.

In some embodiments, metrics are sent via translator/sender 314 and the current sensing/injecting device 312 and received by one or more of the i/o block 214, the translator sender 216, and the system controller 810. In some embodiments, the i/o block communicates metrics and/or alarms based on metrics via one or more of telephone, cell telephone, cellular, Internet, or dedicated links. Any of these links may serve for alerting authorities/services such as fire stations where a fire detector such as a temperature sensor indicates an imminent or existing fire.

Some embodiments may utilize transducers/sensors. For example transducers/sensors may include devices to detect and/or change panel and/or environmental variables. Panel transducers/sensors may include any one or more of panel current, panel voltage, panel temperature transducers/sensors for example to provide panel operation alert(s). Transducers may include any one or more of a temperature transducer/sensor 511, a current transducer/sensor 572, and a voltage transducer/sensor 573. Some embodiments may trigger a fire alarm when temperature transducer/sensor 511 detects a temperature that exceeds a normal operating limit due for example to panel maloperation or due to a fire that overheats the panel.

When an over temperature such as a panel over temperature (e.g., a temperature in excess of a normal operating temperature such as a normal panel operating temperature) or fire event or related alarm occurs which may be detected by temperature transducer/sender 511, one or both of the panel and system controllers 818, 810 may respond. In a panel controller response translator/sender 314 in panel controller 818 may command switches 803, 805 to disconnect the panels. In a system controller response, the panel controller may forward the alarm to the system controller via current sensors/injectors 315, 312. The alarm signals may be received by the first translator/sender 216 in system controller 810 and this translator/sender may then inject a control signal into current sensor/injector 312 to command the panel controller 818 to disconnect switches 803, 805. Either of the panel controller or the system controller may convey an indication of the alarm to responding personnel or systems such as fire stations and system operators via i/o block 214.

When an over current such as a panel over current (e.g., a current in excess of a normal operating current such as a normal panel operating current) or a deleterious current event or related alarm occurs which may be detected by current transducer/sender 512, one or both of the panel and system controllers 818, 810 may respond. In various embodiments the response is similar to that described in connection with an over temperature events above.

When an over voltage such as a panel over voltage (e.g., a voltage in excess of a normal operating voltage such as a normal panel operating voltage) or a deleterious voltage event or related alarm occurs which may be detected by voltage transducer/sender 512, one or both of the panel and system controllers 818, 810 may respond. In various embodiments the response is similar to that described in connection with over temperature events above.

In some embodiments, the values of temperature limit, current limit and voltage limit are stored in involatile memory in panel controller 818. These values may be modified, for example by a system operator. The values may be modified by injecting new values through i/o 214 to translator/sender 216 in system controller 810. Translator/sender 216 may then inject a control signal with the new values to current sensors/injectors 312, 315 and command panel controllers 818 in one or a plurality of panel blocks 847, 849 to update their saved values in their involatile memory.

In some embodiments, values indicating one or more of excessive temperature, current and voltage are stored in panel controller memory 813 such as involatile panel controller memory. These values may be modified, for example a system operator may modify such values stored in the system controller 810 and/or translator sender 216 via the i/o block 214. For example a system operator may modify such values stored in any one or more of the panel controller 818, panel bridge 310, and translator sender 314 via use of i/o block 214, translator sender 216, and first and second current sensors/injectors 312, 315.

In the above embodiments of solar array communications (FIGS. 1, 2A-D, 3A-D, 5, 6A-B, 7A-B, 8A-F), signals injected into either or both current sensors/injectors 312, 315 may be coded signals. The signals may address all panels, different panels, or different groups of panels. For example, the code sequence 0101 may command all panel switches (e.g. 803, 805 in FIG. 8D) to open while different code sequence 1010 may command all panel switches to close.

In the above embodiments of solar array communications (FIGS. 1, 2A-D, 3A-D, 5, 6A-B, 7A-B, 8A-F), memory 813 such as involatile memory may be incorporated in panel bridge 310 and/or in one or more of the translator sender 314, or panel controller 818. This involatile memory may be used to store alarm or similar values for panel temperature, current, and voltage. This involatile memory may be used to store a code sequence or action commanded to manipulate the switches (e.g. 803, 805 in FIG. 8D). For example, this involatile memory may store a code sequence or the action commanded by the code sequence such that a switch or switches maintain the state associated with the last received code sequence stored in memory. For example, a panel bridge 310 may incorporate involatile memory such that associated switches (e.g. 803, 805 in FIG. 8D) maintain the state associated with the last received code sequence stored in memory.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A solar panel array communications system comprising:
   a converter with AC outputs and DC inputs, the AC outputs for connection to an AC source;
   the converter DC inputs coupled to a panel controller via first and second converter conductors;
   the panel controller coupled to n panels where (n>1);
   a first current sensor/injector proximate to the first converter conductor;
   the panel controller including a panel bridge, n switches, and a second translator sender;
   the panel bridge including first and second panel bridge conductors with a diode in parallel with a signal bridge therebetween;
   first and second junctions, the first junction where the first converter conductor joins with the first panel bridge conductor and the second junction where the second converter conductor joins with the second panel bridge conductor;
   the first of the n switches selectively interconnecting a first of the n panels with a second of the n panels;
   the last of the n switches selectively interconnecting the second junction and the last of the n panels;
   the second translator sender coupled to each of the switches and to a second current sensor/injector;
   the second current sensor/injector proximate to the first converter conductor and between the first current sensor/injector and first junction;
   a system controller including a first translator sender, an input/output block, and a backup power supply;
   the first translator sender coupled to the first current sensor/injector, the input/output block, and the backup AC power supply; and,
   the system controller for commanding first and second settings of the switches via use of first and second codes passed between the current sensors/injectors;
   wherein involatile memory in the panel controller stores an indication of the last commanded switch setting.

2. The solar panel array communications system of claim 1 wherein the backup power supply is operable to provide power to the system controller when the AC power source does not.

3. The solar panel array communications system of claim 2 wherein the system controller is operable to issue commands directed to the panel controller when the system controller is operating from backup power.

4. The solar panel array communications system of claim 3 wherein the system controller is operable to issue commands directed to the panel controller when the AC source does not provide adequate power to the system controller.

5. The solar panel array communications system of claim 4 wherein the system controller issues a disconnect command to panel controller switches when the system controller detects its AC source does not provide adequate power.

6. The solar panel array communications system of claim 5 wherein the switches respond to commands from the system controller only when sufficient power from the panels is available.

7. The solar panel array communications system of claim 6 wherein the system controller is operable to receive information from the panel controller only when sufficient power from the panels is available.

8. The solar panel array communications system of claim 7 wherein an indication of the last switch setting commanded by the system controller is stored within involatile memory and after a panel power outage the switches are set according to this indication.

9. The solar panel array communications system of claim 8 wherein the last indication is sent before the panel power outage such that after the panel power outage the switches are set to this last indication.

10. The solar panel array communications system of claim 9 further including a capacitor within the converter and coupled across converter inputs, wherein when one or more of the switches is open commands sent by the system controller reach the panel controller using a circuit including the panel bridge and the converter capacitor.

11. The solar panel array communications system of claim 1 further comprising:
one or more panel sensors with respective alarm limits;
the involatile panel controller memory for storing the respective alarm limits; and,
the panel controller for commanding the n panel controller switches to disconnect from the panels when a panel sensor reaches its alarm limit;
wherein panel controller commands are operative only when sufficient power from the panels is available.

12. The solar panel array communications system of claim 11 further comprising:
a metrics block interposed between the one or more panel sensors and the second translator/sender; and,
the metrics block providing an indication of one or more measurements from the one or more panel sensors to the second translator sender.

13. The solar panel array communications system of claim 12 wherein the second translator sender commands the n panel controller switches.

14. The solar panel array communications system of claim 13 wherein during a panel controller response to a panel sensor reaching an alarm limit, the second translator/sender commands the n switches to disconnect from the panels.

15. The solar panel array communications system of claim 14 wherein indications of panel temperature, current, and voltage are sent from the panel controller to the system controller via the two current sensors/injectors.

16. A solar panel array communications system comprising:
a converter with AC outputs and DC inputs, the AC outputs for connection to an AC source;
the converter DC inputs being first and second converter conductors coupled to m>1 serially interconnected panel blocks;
a system controller including a translator/sender, an i/o block, and a backup power supply;
a system controller current sensor/injector proximate to the first converter conductor;
a first of m current sensors/injectors proximate to the first converter conductor and between the system controller current sensor/injector and the first of the m serially interconnected panel blocks;
each of the m panel blocks including a panel controller for receiving DC power from an array of n>1 serially interconnected panels;
each of the m panel controllers including n switches, a translator/sender, and involatile memory, and a panel bridge;
the n switches in each panel controller for removing the n panels interconnected by the switches from the series circuit interconnecting the panels;
a first of the m panel controllers connected to the first converter conductor;
a last of the m panel controllers connected to the second converter conductor;
the first of the m current sensors/injectors coupled to the first of the m panel controllers; and;
in $1^{st}$ ... (m−1) interconnections between the $1^{st}$ ... $m^{th}$ serially interconnected panel controllers, the $2^{nd}$ ... $m^{th}$ current sensors/injectors distributed proximate each interconnection and coupled respective ones of the $2^{nd}$ ... $m^{th}$ panel controllers;
wherein the system controller is operative to send switch open and switch close codes to involatile memory in each panel controller, the last switch code received in involatile memory operative to command a common state for the n switches in each of the panel controllers.

17. The solar panel array communications system of claim 16 wherein a panel controller translator/sender receives measurements made by a panel sensor.

18. The solar array panel array communications system of claim 17 wherein a measurement indicating an out of range operating condition causes the panel controller to open the n panel switches therein.

19. The solar array panel array communications system of claim 18 wherein a measurement indicating an out of range operating condition causes the panel controller to send an alert to the system controller which in turn opens the n switches in each of the remaining panel controllers.

* * * * *